US006822633B2

(12) United States Patent
Takaoka et al.

(10) Patent No.: US 6,822,633 B2

(45) Date of Patent: Nov. 23, 2004

(54) LIQUID CRYSTAL DISPLAY

(75) Inventors: Hironori Takaoka, Kikuchi-gun (JP); Hisaharu Oura, Kikuchi-gun (JP); Susumu Shibata, Kikuchi-gun (JP); Tetsuya Ikemoto, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 273 days.

(21) Appl. No.: 09/972,938

(22) Filed: Oct. 10, 2001

(65) Prior Publication Data

US 2002/0050973 A1 May 2, 2002

(30) Foreign Application Priority Data

Oct. 26, 2000 (JP) ....................................... 2000-327208

(51) Int. Cl.[7] ............................. G09G 3/36; H04N 3/14

(52) U.S. Cl. .......................... 345/102; 345/99; 348/790

(58) Field of Search ............................ 345/87, 99, 102, 345/100, 94, 213; 348/794, 790, 791, 766, 761

(56) References Cited

U.S. PATENT DOCUMENTS

| | | | | |
|---|---|---|---|---|
| 4,958,915 A | * | 9/1990 | Okada et al. | 350/345 |
| 5,838,294 A | * | 11/1998 | Praiswater | 345/102 |
| 5,844,540 A | * | 12/1998 | Terasaki | 345/102 |
| 5,854,662 A | * | 12/1998 | Yuyama et al. | 348/790 |

* cited by examiner

*Primary Examiner*—Amr Awad
*Assistant Examiner*—Alecia D. Nelson
(74) *Attorney, Agent, or Firm*—Oblon, Spivak, McClelland, Maier & Neustadt, P.C.

(57) ABSTRACT

A liquid crystal display according to the present invention can prevent interference fringe on a display panel due to a switching noise of a DC/DC converter, therefore a high-quality image can be displayed. Either of input signals for a timing control circuit is also supplied to a PLL circuit and the DC/DC converter is controlled by an output signal of the PLL circuit, thereby enables to synchronize a switching frequency of the DC/DC converter and control signal.

3 Claims, 6 Drawing Sheets

LIQUID CRYSTAL DISPLAY

BACKGROUND OF THE INVENTION

The present invention relates to a liquid crystal display (hereinafter "LCD"), especially to a driving circuit of LCD and an inverter for supplying voltage to a backlight of LCD.

A display panel of a LCD consists of a lot of pixels arranged into a form of matrix, that is, rows and columns. Each pixel in the display panel includes a switching element, such as a thin film transistor (hereinafter "TFT"), connected to respective gate line and signal line. In addition, a pixel electrode is connected to the TFT. When a TFT is turned ON by an electric signal on the respective gate line, a voltage of the respective signal line is applied to the pixel electrode connected to the TFT. An electric field is applied to liquid crystal substances between the pixel electrode and another electrode (hereinafter "counter electrode") so that the liquid crystal substances around the electrodes are driven to display an image.

A circuit for giving voltages to the pixel electrodes and an operation of the circuit will be described more in detail. As shown in FIG. 3, a clock signal CLK, a horizontal synchronous signal HD, a vertical synchronous signal VD, a data enabling signal DENA for specifying display period, a data signal DATA and the like are input to a timing control circuit 1 as input signals. These input signals are previously in phase, that is, synchronized. The timing control circuit 1 generates a control signal SC for a signal line driving circuit 2 and a control signal GC for a gate line driving circuit 3 from these input signals, and the control signal SC is input to the signal line driving circuit 2 with the data signal DATA and the control signal GC is input to the gate line driving circuit 3.

Using a voltage VDDA supplied from a DC to DC converter (hereinafter "DC/DC converter") 5 as a power supply, the signal line drive circuit 2 outputs a signal line voltage VS, which is determined by the data signal DATA and the control signal SC, to each signal line. On the other hand, the gate line drive circuit 3 outputs a gate line voltage VG to each gate line, based on the control signal GC and using voltages VGH and VGL supplied from the DC/DC converter 5 as a power supply.

For the display panel 4, waveforms of a gate line voltage VG, a signal line voltage VS and a counter electrode voltage VCOM are shown in FIG. 5. In FIG. 5, gate line voltages of the "n"th and "n+1"th gate lines are shown above marked with VGn and VGn+1 respectively, and a signal line voltage VS of the "m"th signal line and a counter electrode voltage VCOM are shown below.

Each TFT in the display panel 4 is in an ON state during the gate line voltage VG applied thereto is at the voltage VGH, thereby the signal line voltage VS is applied to the pixel electrode. Thereafter, by switching the gate line voltage VG from voltage VGH to voltage VGL, the TFT is turned OFF so that the pixel electrode is electrically separated from the signal line and maintains the voltage VS until the TFT is turned ON again. Therefore, a voltage, which has been applied to liquid crystal substances between the pixel and counter electrode during this period of OFF state, is theoretically represented by the voltage difference |VS−VCOM| between the pixel and counter electrode at the point when the TFT turned OFF, that is, a voltage V in FIG. 5.

However, as shown in FIG. 5, there appears switching noise of the DC/DC converter 5 on the signal line voltage VS and the counter electrode voltage VCOM in the prior art LCD. Moreover, the gate line voltage VG, the signal line voltage VS and switching operation of the DC/DC converter 5 are not in phase, that is, not synchronized.

Therefore, as shown in FIG. 5, the voltage of |VS−VCOM|=Vn when the gate line voltage VGn of the "n"th gate line becomes VGL to turn the TFT OFF, and the voltage of |VS−VCOM|=Vn+1 when the gate line voltage VGn+1 of the "n+1"th gate line becomes VGL to turn the TFT OFF are different. That is, even if the same signal line voltage VS is applied, a voltage |VS−VCOM| applied to liquid crystal substances varies with each gate line, results in an interference fringes (or beat noise) on the display screen.

Typical LCD comprises a backlight 12 as a light source. The backlight 12 consists of a lamp, such as a cold cathode tube, and inverter for supplying voltage to the lamp by oscillation thereof.

In addition, the inverter comprises dimmer function for adjusting brightness of the backlight. Conventionally, as the dimmer function, PWM dimmer method for changing lamp brightness with varying duty ratio of the inverter output is employed.

An oscillation frequency FQ and dimmer signal BR of the inverter are not synchronized with the gate line voltage VG, the signal line voltage VS and the switching frequency of the DC/DC converter. In FIG. 6, waveforms of the signal line voltage VS, the switching frequency of the DC/DC converter, oscillation frequency of the inverter and the VCOM influenced by noise are shown.

As shown in FIG. 6, since the signal line voltage VS, the switching frequency of the DC/DC converter and oscillation frequency of the inverter are not in phase, voltage VCOM at the end of the period for gate line selection, i.e. at the point when VGH is switched to VGL, is always changing. Therefore, since the value of |VS−VCOM|=V are not steady in each gate line, there appears interference fringes (or beat noise) on the display so that the display quality is deteriorated.

Further, the voltage VDDA for signal line driving circuit and voltages VGH and VGL for the gate line driving circuit also includes voltage variation. In addition, a dimmer signal of the inverter shall not synchronized with a signal line voltage VS and a switching frequency of the DC/DC converter so that the display quality is deteriorated.

Therefore, an object of the present invention is to obtain high-quality display with preventing the interference fringes on the display screen due to the switching noise of this DC/DC converter.

Another object of the present invention is to obtain high-quality display without interference fringes without being influenced by the inverter frequency and the dimmer signals of the backlight.

SUMMARY OF THE INVENTION

A LCD according to the present invention is characterized in that the switching frequency of the DC/DC converter is synchronized with the control signal supplied from the timing control circuit by using a PLL circuit.

Moreover, a LCD of the present invention is characterized in that the oscillation frequency of the inverter for supplying voltage to a lamp of the backlight, and dimmer signals of PWM dimmer method for carrying out switching operation are synchronized with the control signal supplied from the timing control circuit.

According to the present invention, phases of the switching frequency of the voltage supplied from the DC/DC converter and the control signal supplied from the timing control circuit are synchronized, thereby reducing variation of the voltage of |VS−VCOM| for each gate line, that is, switching noise effectively and preventing interference fringes on the display so that high-quality display is obtained.

Moreover, the oscillation frequency of the inverter for supplying voltage to the lamp and the dimmer signal are in phase with the control signal, thereby enables to reduce the frequency interference to prevent the interference fringes, therefore, high quality image can be displayed.

By carrying out phase matching of all signals in LCD such as control signal, switching frequency of the DC/DC converter, further, oscillation frequency and dimmer signal of inverter, it becomes possible to reduce the noise caused by variation in voltage applied to the display to prevent the interference fringe on the display, so that high-quality image can be obtained.

DETAILED DESCRIPTION

The embodiments of the present invention are described below with referring to the attached drawings.

Embodiment 1

The present embodiment is characterized in that the switching operation of the DC/DC converter is synchronized with the control signal output from the timing control circuit.

The method how the switching operation of the DC/DC converter is synchronized with the control signal output from the timing control circuit is explained with reference to FIG. 1.

Figure 1:
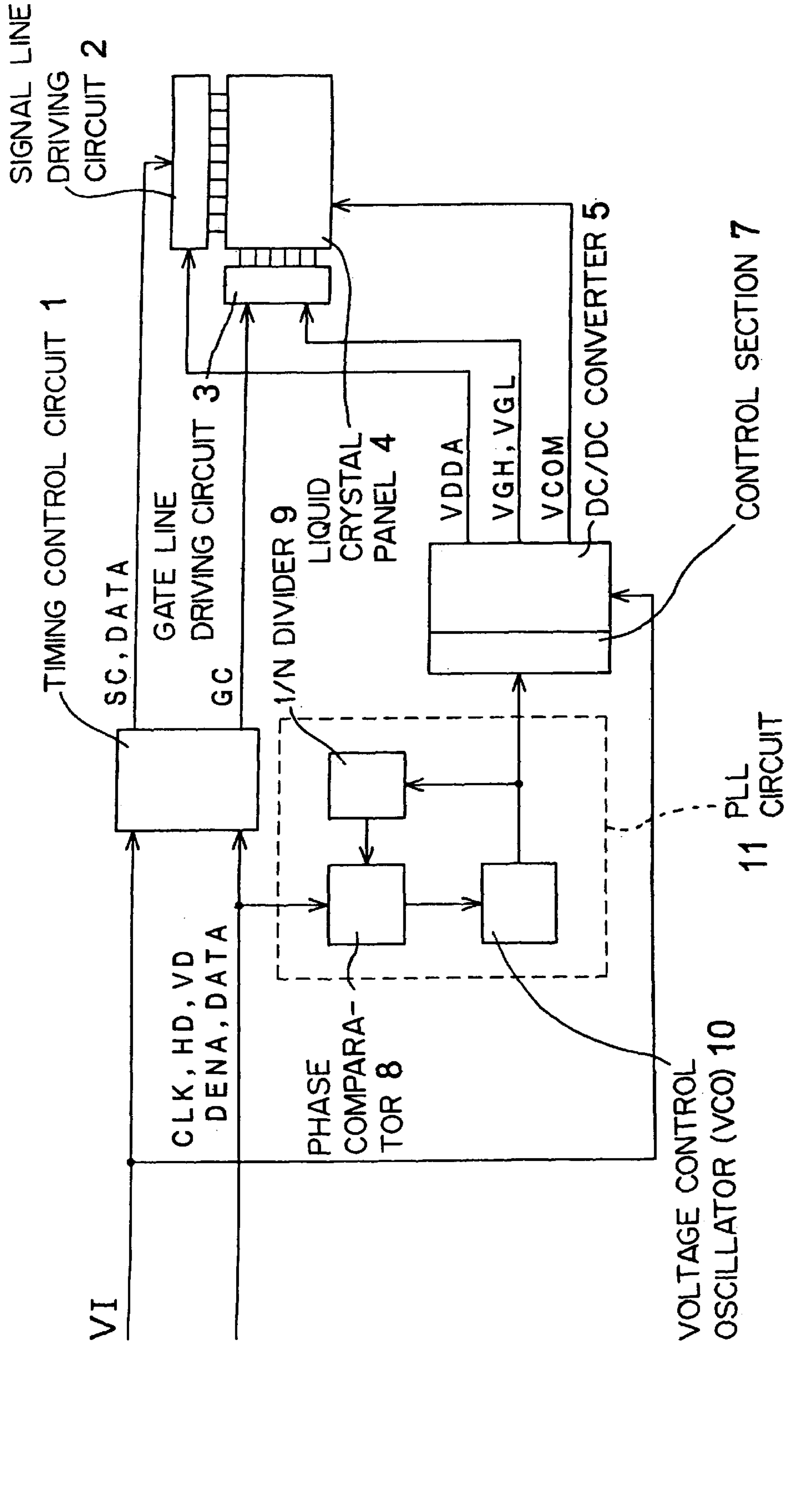
FIG. 1 is a block diagram showing EMBODIMENT 1 of the present invention.

FIG. 1 shows a block diagram of a LCD according to the present embodiment. A clock signal CLK, a horizontal synchronous signal HD, a vertical synchronous signal VD, a data enabling signal DENA for specifying display period, a data signal DATA and the like are input into a timing control circuit 1. These signals are previously synchronized with each other. In the timing control circuit 1, control signal SC for a signal line driving circuit 2 and control signal GC for a gate line driving circuit 3 are generated and are input into each drive circuit.

Moreover, a voltage VI is externally supplied to the timing control circuit 1 and a DC/DC converter 5. The DC/DC converter 5 generates a voltage VDDA for the signal line driving circuit, voltages VGH and VGL for the gate line driving circuit, and voltage VCOM for counter electrode of the liquid crystal panel 4.

The signal line driving circuit 2 outputs a signal line voltage VS for each signal line, based on the data signal DATA and the control signal SC, using the voltage VDDA supplied from the DC/DC converter 5 as power source. The gate line driving circuit 3 outputs a gate line voltage VG to each gate line, based on the control signal GC, using the voltages VGH and VGL supplied from the DC/DC converter 5 as power source.

In order to synchronize the alternating voltage generated by the DC/DC converter 5 with the control signal SC, GC output from timing control circuit 1, a PLL circuit 11 is provided. Either of several input signals which are input to the timing control circuit 1 is also input into a phase comparator 8 in the PLL circuit 11. In the PLL circuit 11, furthermore, a VCO (voltage control oscillator) 10 and an 1/N divider 9 are provided and a signal with the frequency multiplied N, synchronized with the signal input to phase comparator 8, is generated and output.

The signal output from the PLL circuit 11 is input to a control section 7 in the DC/DC converter 5. Therefore, the DC/DC converter 5 operates at the switching frequency which is in phase with several kinds of input signals CLK, HD, VD, DENA, and DATA. By this, output voltages of DC/DC converter 5, VDDA, VGH, VGL, and VCOM are in phase with several input signals CLK, HD, VD, DENA, and DATA. Meanwhile, the DC/DC converter 5 runs freely until signal from the PLL circuit 11 is input.

Figure 4:
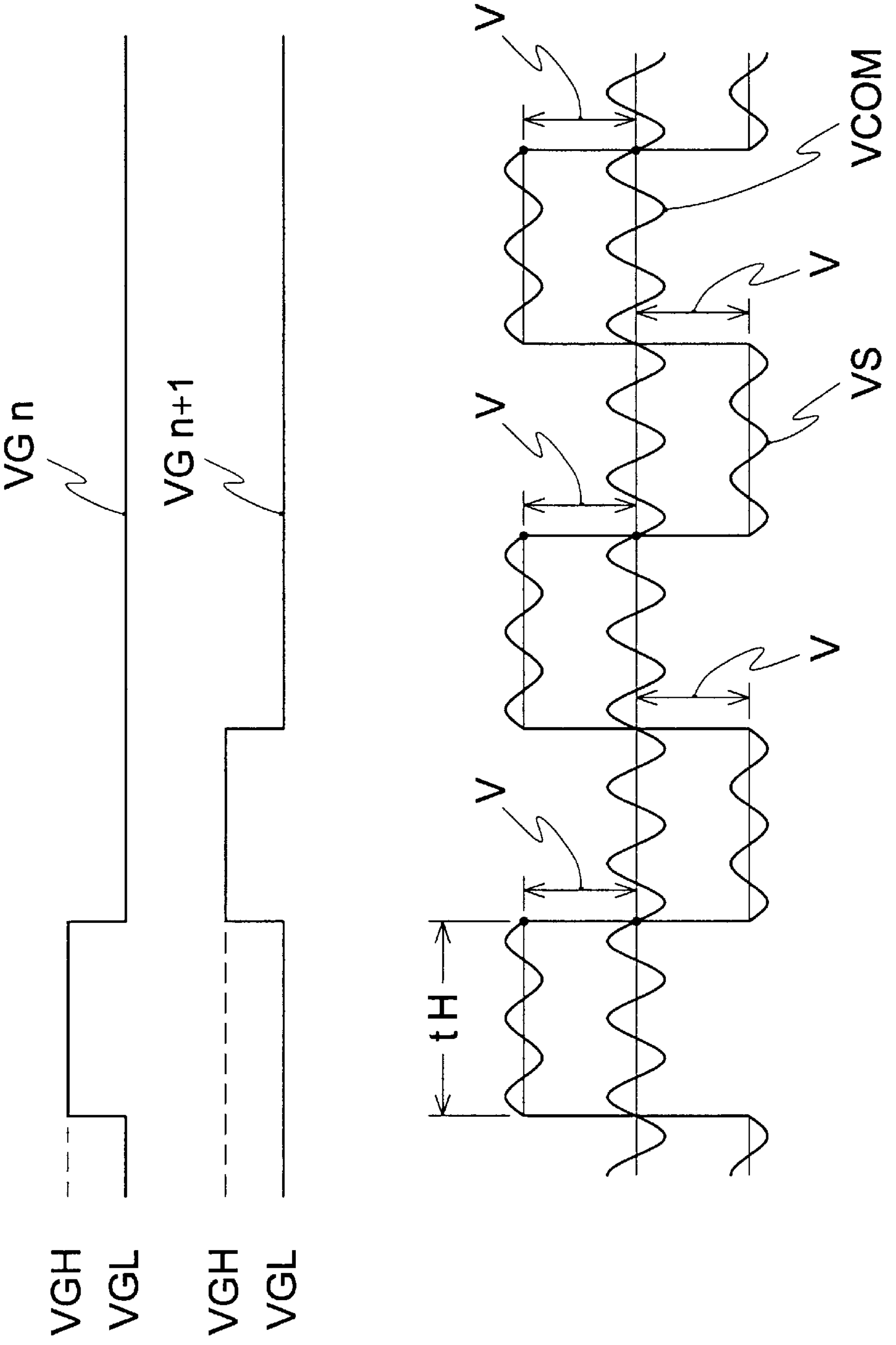
FIG. 4 is a diagram showing waveforms of signals in which phase matching are carried out according to the present invention.
Figure 5:
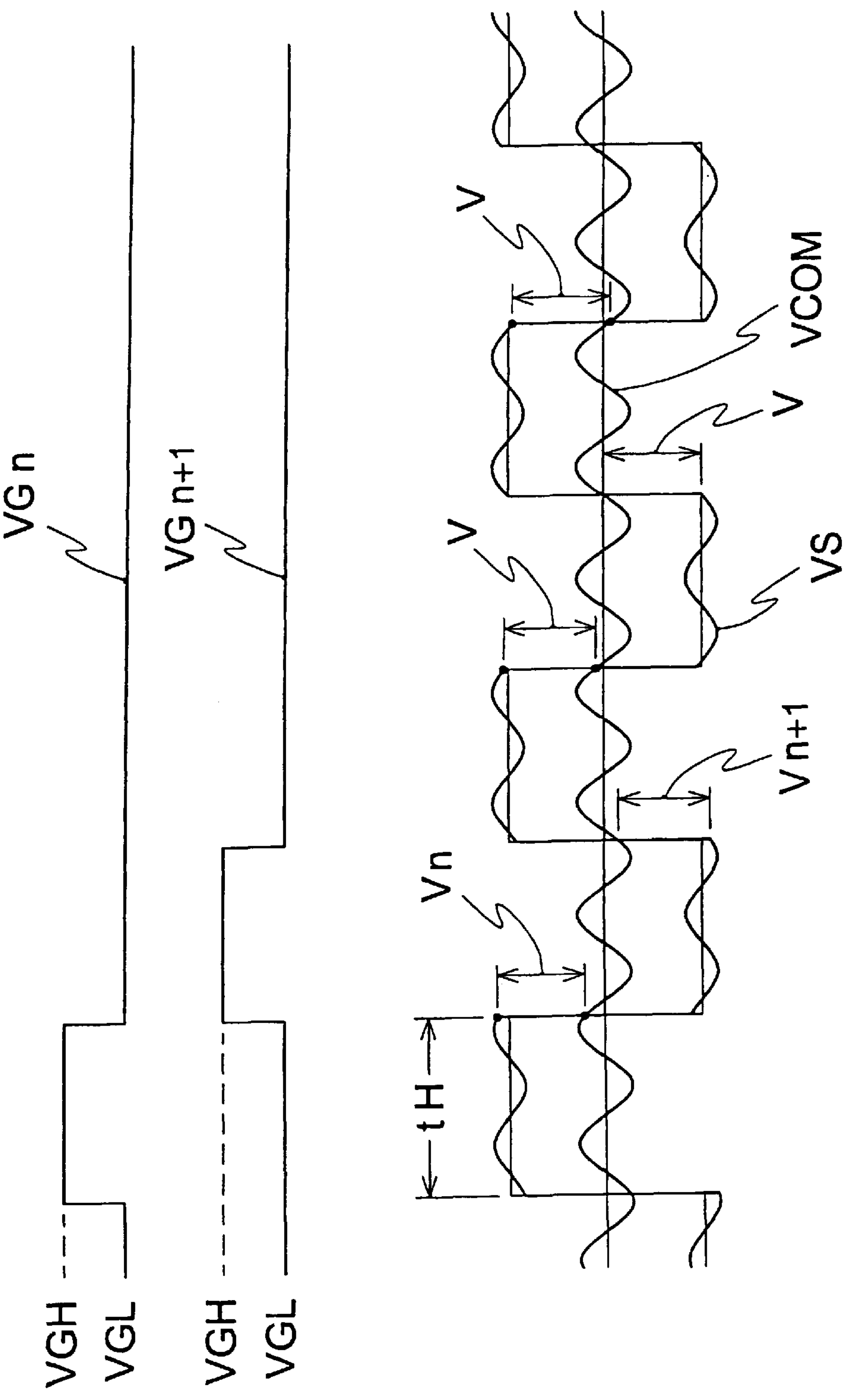
FIG. 5 BACKGROUND ART
FIG. 5 is a diagram showing waveforms of signals in the prior art LCD.
Figure 6:
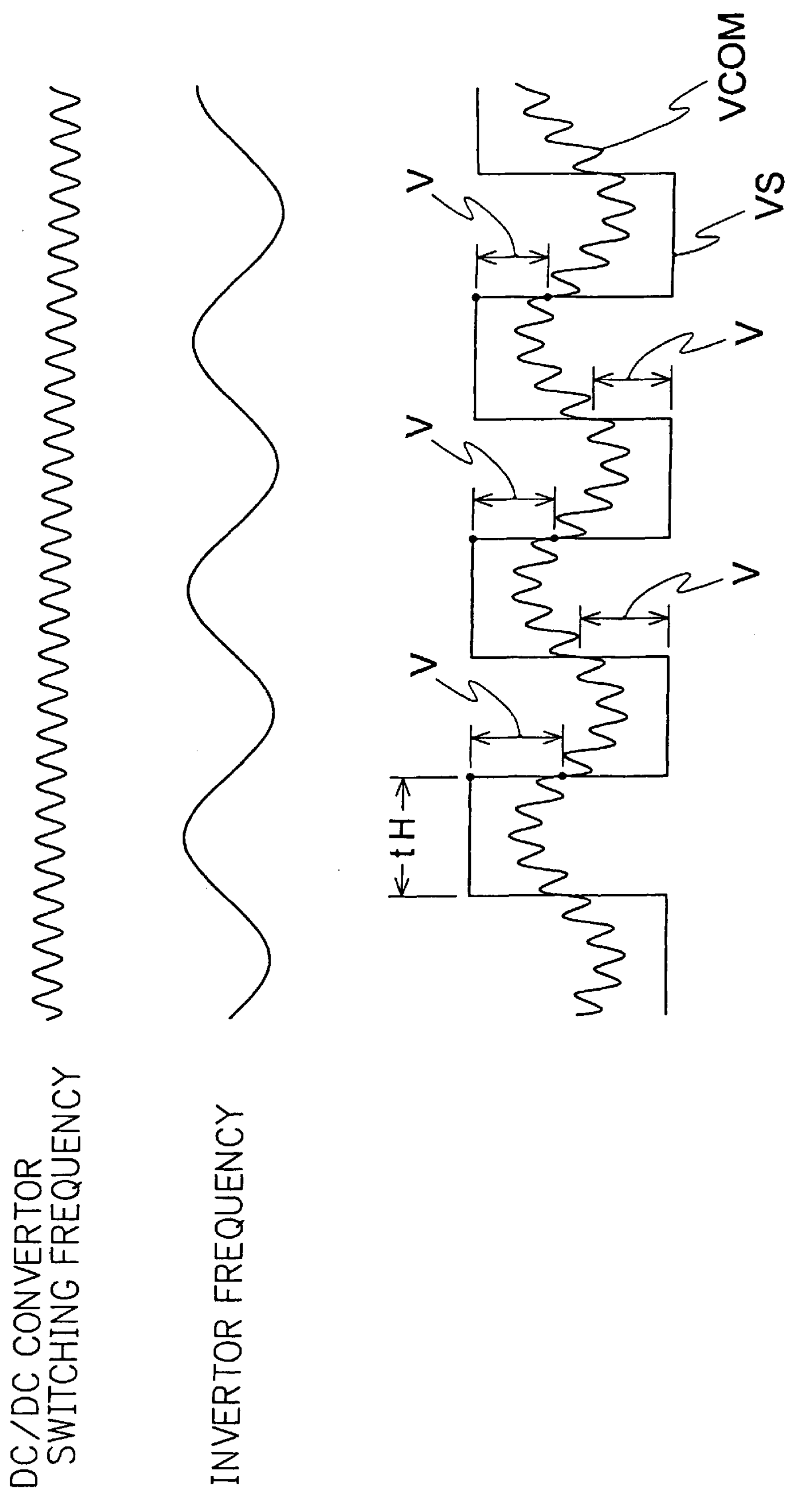
FIG. 6 BACKGROUND ART
FIG. 6 is a diagram showing waveforms of signals in the prior art LCD having an inverter for a backlight.

FIG. 4 shows waveforms of gate line voltage VG, signal line voltage VS, and counter electrode voltage VCOM in the present embodiment. In FIG. 4, gate line voltage of the "n"th gate line, and gate line voltage of the "n+1" th gate line are shown in the above marked with "VGn" and "VGn+1" respectively, and signal line voltage VS of the "m"th signal line and counter electrode voltage VCOM are shown in the below.

There appears switching noise of the DC/DC converter 5 in the waveform of signal line voltage VS and counter electrode voltage VCOM. However, in the present embodiment, signals input to timing control circuit 1 are in phase with output voltage of the DC/DC converter 5. Because control signals SC and GC is generated from the input signal, and gate line voltage VG and signal line voltage VS are generated based on the control signals SC and GC, all of these are necessarily synchronized. Namely, ON/OFF operation of the TFT, which is controlled by the gate line voltage VG, is synchronized with switching frequency of the DC/DC converter 5, the voltage difference |VS−VCOM|=V becomes constant for each gate line, regardless of the existence of the switching noise.

Therefore, interference fringe never occurs and display with good quality can be obtained.

Embodiment 2

An example where a backlight and an inverter which supplies voltage to a lamp of the backlight are provided is shown in the present embodiment.

Figure 2:
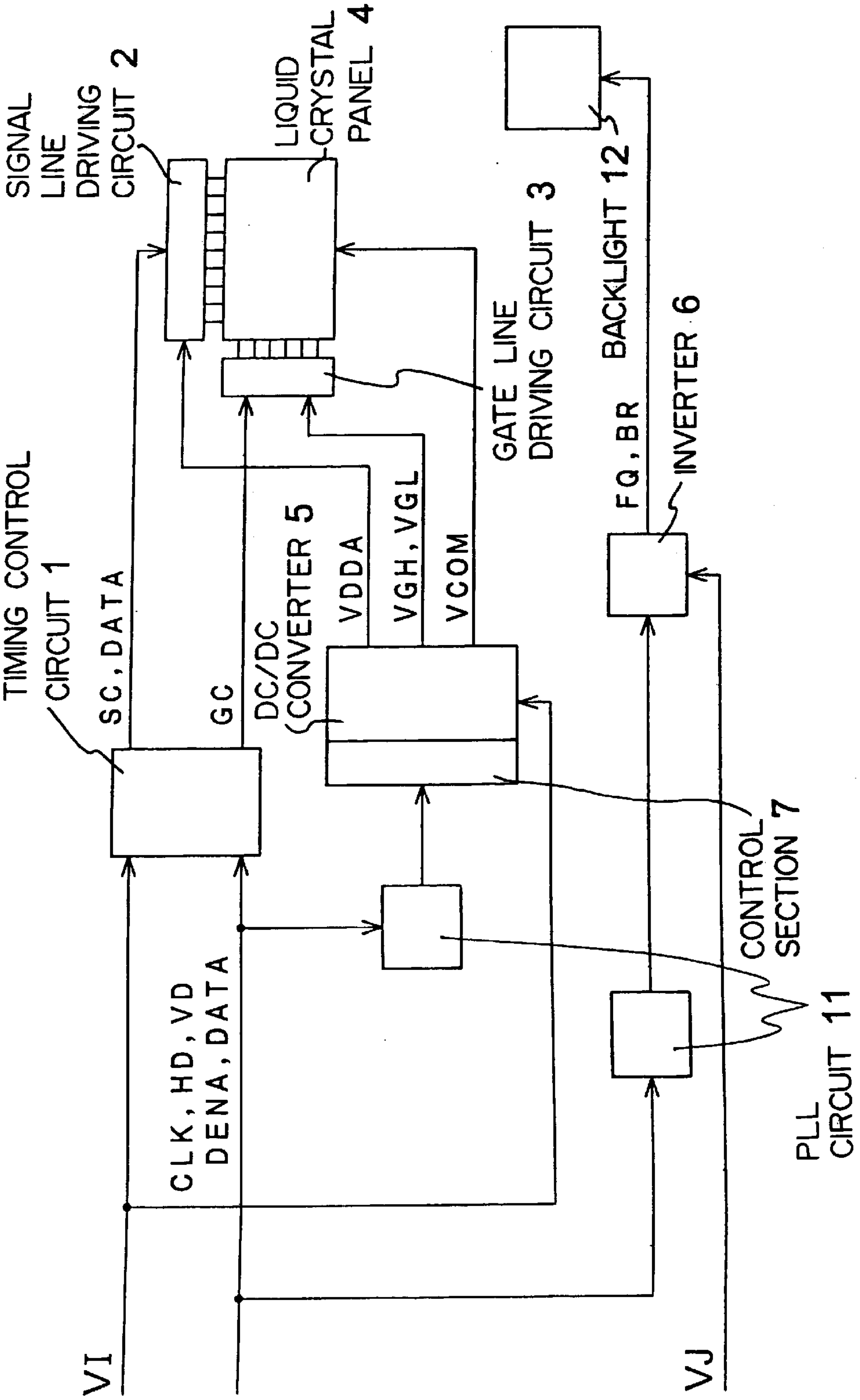
FIG. 2 is a block diagram showing EMBODIMENT 2 of the present invention.
Figure 3:
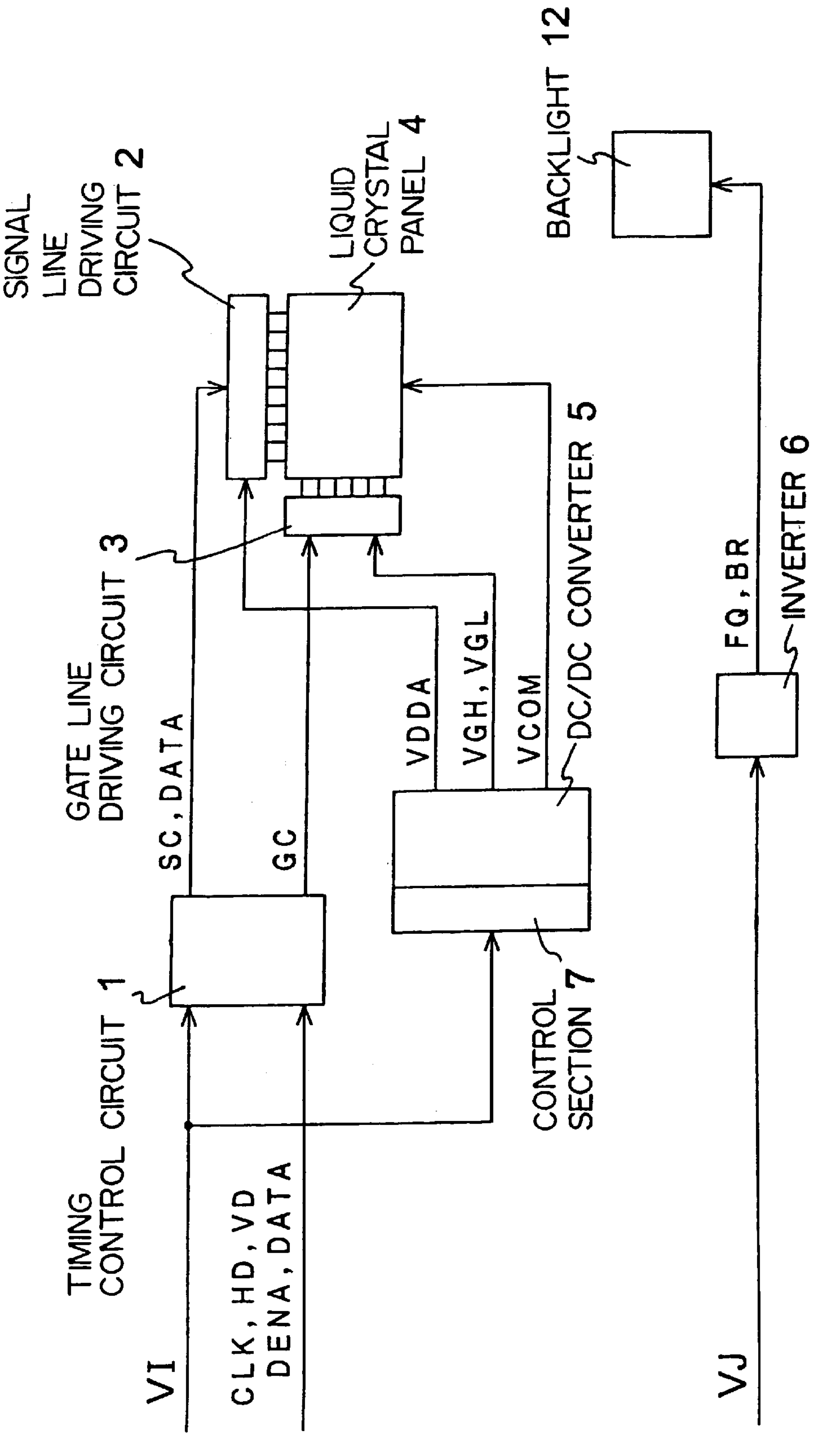
FIG. 3 BACKGROUND ART
FIG. 3 is a block diagram showing the prior art LCD.

FIG. 2 shows the block diagram of LCD of the present embodiment. As described in Embodiment 1, either of the input signals input into timing control circuit 1 is also input into the PLL circuit 11 and by controlling the DC/DC converter 5 with the output signal from the PLL circuit 11, the switching frequency of the DC/DC converter 5 is in phase with the phase of control signal SC and GC.

Furthermore, either of the input signals is input into another PLL circuit 11 and the inverter 6 is oscillated and outputs voltage for backlight according to the output signal from this PLL circuit 11. By doing this, the oscillating frequency of the inverter 6 can be synchronized with the control signal SC and GC.

By phase-matching the oscillating frequency of the inverter 6 and the control signal, the voltage of |VS−VCOM| becomes constant for each gate line, and good quality display without any interference fringe can be obtained.

Similarly, the dimmer signal for PWM control may be in phase with the control signal. By doing this, the voltage of |VS−VCOM| becomes constant for each gate line, and excellent quality display without any interference fringe can be obtained.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. A liquid crystal display comprising:

an inverter configured to supply an inverter voltage to a backlight;

a DC/DC converter configured to convert converter input voltage to converter output voltages and to apply the converter output voltages to a signal line driving circuit, a gate line driving circuit and a counter electrode;

a timing control circuit configured to receive synchronized input signals and to generate and apply control signals to the signal line driving circuit and to the gate line driving circuit based on said received synchronized input signals; and phase locked loop (PLL) circuitry configured to receive at least one of said synchronized input signals and to provide PLL output signals to the DC/DC converter and to the inverter, wherein the signal line driving circuit is configured to output a signal line voltage to a signal line based on said converter output voltages and said control signals applied thereto, wherein the gate line driving circuit is configured to output a gate line voltage to a gate line based on said converter output voltages and said control signals applied thereto, and wherein the DC/DC converter and the inverter are configured to operate in synchronization with the PLL output signals applied thereto.

2. The liquid crystal display of claim 1, wherein a phase of switching frequency of said signal line voltage, said gate line voltage, a voltage output to the counter electrode, and a phase of oscillation frequency of the inverter are synchronized.

3. The liquid crystal display of claim 1, wherein the inverter is a PWM inverter for dimming a brightness of the backlight.

* * * * *